July 2, 1963  S. E. FISHER  3,095,857

LEASH

Filed July 17, 1961

INVENTOR
STANTON E. FISHER 3,095,857
LEASH
Stanton E. Fisher, 706 Lantern, St. Louis, 3, Mo.
Filed July 17, 1961, Ser. No. 124,707
1 Claim. (Cl. 119—109)

This invention relates to a leash, thong, cord, band, or similar connecting device, having a planar spiral or coiled configuration when not under tension, which is converted under tension to a three dimensional spiral or coiled configuration. More particularly this invention relates to a leash which is converted from a planar spiral configuration to a three dimensional spiral configuration when tension is applied longitudinally thereto.

I have now discovered a convenient and practical leash which can be packed and/or stored compactly in a planar spiral form when not in use and which possesses an appealing spiral or coiled three dimensional configuration under tension. Its configuration under tension is that of a leash with a built in spiral or coiled curl which does not disappear with use.

The invention is illustrated by the attached drawings.

Figure 1:
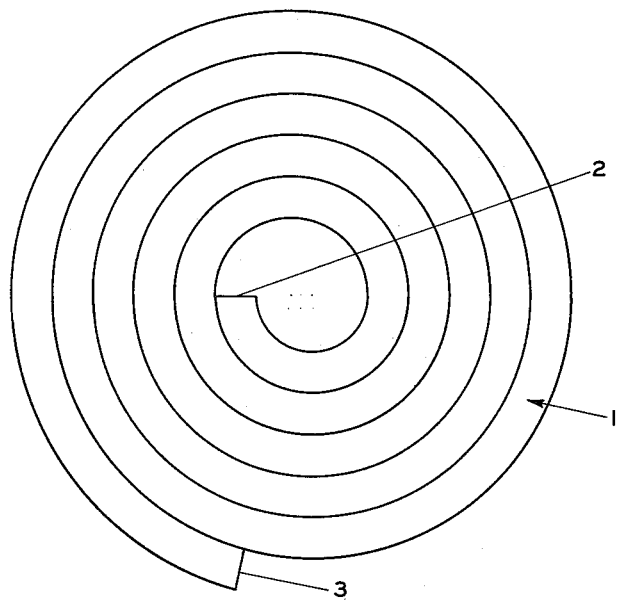
Figure 2:
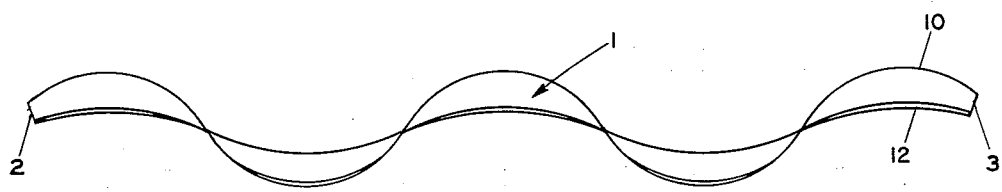
Figure 3:
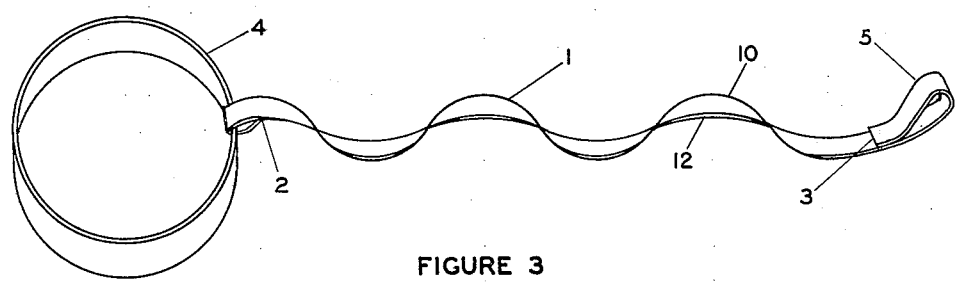

FIGURE 1 is a top planar view. FIGURE 2 is a side view. FIGURE 3 is a side angle view.

FIGURE 1 is a top planar view of a leash illustrating the compact planar spiral configuration when not under tension. The spiral configuration is described by following strip 1 from its center terminal 2 at the core spirally by an ever increasing radius to the circumferential terminal 3 of the strip on the outer end of the spiral.

The coiled or spiral configuration is built into the leash by cutting a ribbon-like strip 1 from the material employed, along the lines shown in FIGURE 1 while it is planar, as is clearly apparent from the drawings. By cutting the strip in this manner a leash having inner edge 12 and outer edge 10 of unequal length is produced which describes a spiral of ever increasing radius with a built in spiral that does not disappear when extended longitudinally. In other words, the coiled effect is imparted to the leash when cut.

In practice, the leash is prepared from a sheet of material such as leather, plastic, etc., which is preferably of circular or circular-like configuration or a polygonal configuration approaching circular configuration, etc., by cutting it along the lines of FIGURE 1 so that a single strip results when the center terminal 2 and circumferential terminal 3 are pulled longitudinally.

The spiral, coiled, or curled effect of the leash under tension is shown in FIGURE 2 which is a side view of the leash under tension. 1, 2 and 3 of FIGURE 2 illustrate the same members as in FIGURE 1 except that 1, 2 and 3 in FIGURE 1 is planar coiled while 1, 2 and 3 in FIGURE 2 is coiled three dimensionally under tension.

FIGURE 3, a side angle view, illustrates the use of the leash of this invention as an animal or dog leash. 1, 2 and 3 have the same meanings as in FIGURES 1 and 2 except that terminal 2 is attached to the collar of the animal at 4 and circumferential terminal 3 is looped at 5 so that it can be held more firmly in the hand.

The term, "leash" as employed in claims also include thongs, cords, bands or similar connecting devices.

While certain representative embodiments and details have been shown for the purpose of illustrating the invention, it will be apparent to those skilled in the art that various changes and modifications may be made therein without departing from the spirit or scope of the invention.

Having thus described my invention, what I claim as new and desire to obtain by Letters Patent is:

A flat ribbon-like leash of planar spiral configuration having one edge thereof of greater length than the length of the other edge, each of said edges being of a fixed length relative to each other, whereby said leash is converted to a three dimensional spiral configuration when the leash is extended.

References Cited in the file of this patent
UNITED STATES PATENTS

| | | |
|---|---|---|
| 358,779 | Jones | Mar. 1, 1887 |
| 2,833,250 | Beebe | May 6, 1958 |
| 2,861,547 | Dale | Nov. 25, 1958 |
| 2,911,947 | Kramer | Nov. 10, 1959 |